Figure 1:
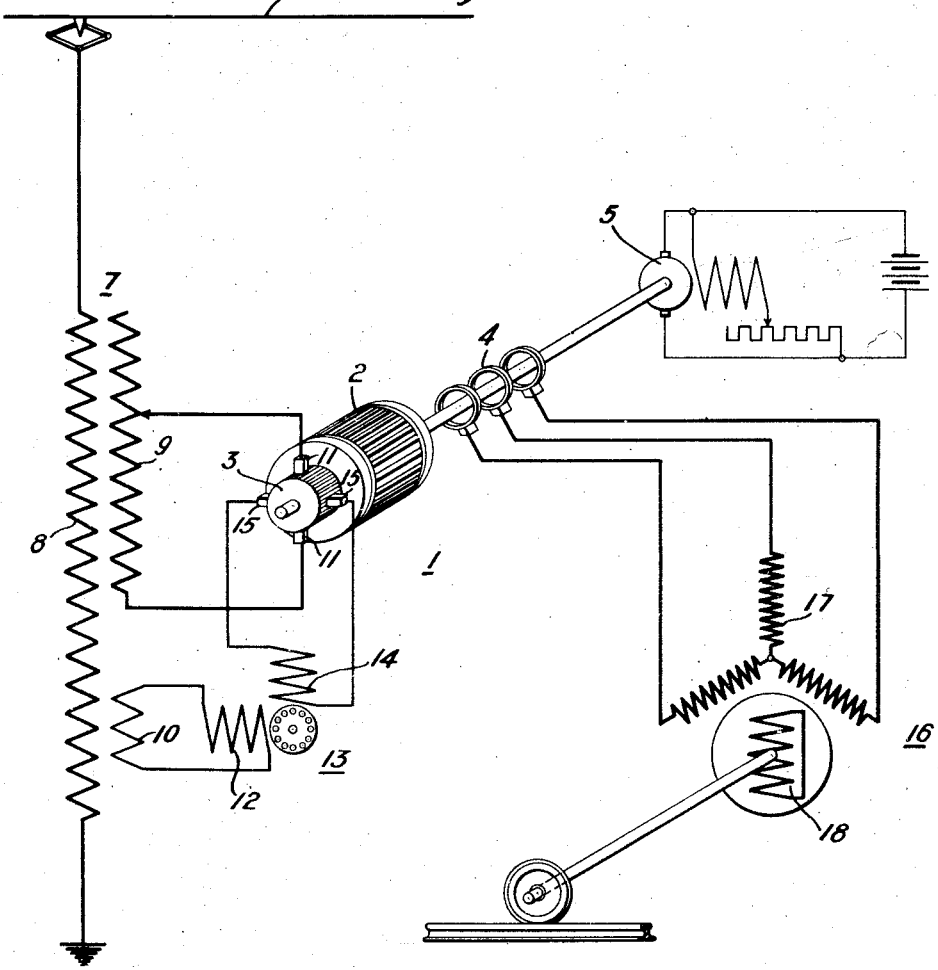

March 18, 1924.

J. SLEPIAN 1,486,929

FREQUENCY CHANGER SYSTEM

Filed April 18, 1919

WITNESSES:
H. J. Shelhamer
A. A. Brand

INVENTOR
Joseph Slepian
BY
Wesley G. Carr
ATTORNEY

Patented Mar. 18, 1924.

1,486,929

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

FREQUENCY-CHANGER SYSTEM.

Application filed April 18, 1919. Serial No. 291,157.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Frequency-Changer Systems, of which the following is a specification.

My invention relates to electrical systems, and it has especial relation to systems in which a consumption device draws currents of one phase number and frequency from a source of another phase number and frequency, the medium whereby the conversion is accomplished being a frequency-changer.

In the operation of induction motors from a single-phase source, as in railway electrifications, it is desirable that the motors shall be of the self-starting type and, to this end, it has been proposed to employ a phase converter wherewith the single-phase currents of the supply are converted into polyphase form for application to a polyphase consumption device. With a system of this character, effective operation of the motor is assured at predetermined speeds, but it is difficult to adjust the speed thereof in an efficient manner.

It has further been proposed to employ an auxiliary machine combining both the function of a phase converter and of a frequency changer, whereby substantially symmetrical polyphase currents, which are converted from the single-phase source, have their frequency adjusted by the converter machine and are utilized in a consumption device In this way, the speed of the consumption device may be varied by varying the frequency of the currents which are supplied thereto.

When a commutator-type machine is operated as a combined phase-converter and frequency-changer, to convert single-phase currents of one frequency to balanced polyphase currents of another frequency, it is impossible to make the distribution of currents in the armature of the frequency-changer the same for the single-phase currents as for the polyphase currents. As a result, it has been necessary heretofore to make the armature considerably larger than would have been necessary had the single-phase currents in each conductor of the armature been equal and opposite, at all times, to the polyphase currents therein.

One object of my invention, therefore, is to provide an electrical system in which the consumption devices and the converting machine are so related to one another that no currents will flow in the system which will merely serve to heat the apparatus. In other words, I intend to make my consumption device of such character that the currents drawn thereby will have the same current-distribution in the armature of the converting machine as the single-phase currents supplied by the source of energy. The single-phase currents in the converter armature will therefore be substantially completely neutralized by the polyphase currents, in a manner well understood in connection with rotary converters. The size of the frequency-changer machine will, therefore, be reduced to a minimum.

Another object of my invention is to so arrange an electrical system that an induction motor may be conveniently and effectively started from rest without the interposition of split-phase starting devices or otherwise and, moreover, may be conveniently and effectively adjusted in speed by a positive controlling element, this last element being of such nature that it may be placed in the cab, for instance, of an electrical locomotive to which my electrical system is applied.

In the accompanying drawing, the single figure is a diagrammatic view of one form of system embodying my invention.

For a more detailed understanding of my invention, reference may be had to the drawing, wherein a converting machine is shown at 1, this machine comprising an armature 2, a commutator 3 and slip rings 4. The armature 2 is provided with any desired standard type of winding, such, for example, as a drum winding, the segments of the commutator 3 and the slip rings 4 being connected thereto as in the ordinary rotary converter.

It is unnecessary to provide an exciting field for the machine 1 when it is driven from a separate source, it being necessary to provide merely a keeper, either fixed or rotatable, for the closure of the magnetic circuit. The machine 1 may be driven at any desired speed, as by connection to an adjustable-speed, direct-current, motor 5.

Energy for the operation of the system is derived from a single-phase source, here shown as a transformer 7, a primary winding 8 of which is connected between the trolley wire 6 and the ground, and secondary windings 9 and 10 of which are utilized for energization.

The secondary winding 9 is arranged to be adjustable and is connected to a pair of brushes 11—11 which bear upon the commutator 3.

The secondary winding 10 is connected to energize a primary winding 12 of a small auxiliary phase converter 13, a tertiary winding 14 of which is connected to auxiliary brushes 15—15 bearing on the commutator 3, these latter brushes being mounted in electrical quadrature to the brushes 11—11.

Polyphase energy is derived from the slip rings 4 and is supplied to a motor 16 which is provided with a polyphase primary winding 17 and with a single-phase secondary winding 18, the secondary winding being here shown as applied to the rotor of the machine 16.

In operation, single-phase currents are fed into the armature of the machine 1, through the brushes 11—11. Let us assume, for the moment, that the armature of the converting machine is stationary. The electromotive forces between one brush and other points on the commutator will steadily increase as said points are moved from said brush to the other brush, but all of said electromotive forces will be in phase. If symmetrical points on the armature are tapped off, the electromotive forces appearing at the tapped points will not be balanced polyphase electromotive forces but will be alternating in character and will have such values that if said electromotive forces are applied to a similar polyphase field winding, such as the primary winding 17 of the motor 16, the flux conditions of the armature 2 will be duplicated in said field winding.

If now the armature is rotated at a certain velocity, it is evident that the electromotive forces at the polyphase terminals will still be pulsating in character but will rotate at an equal velocity in the opposite direction. The field produced in the field winding 17 will then be the same as the field which would be produced in the armature 2 if the latter were stationary and the brushes were rotating backwardly at the speed assumed for the armature. The motor 16, therefore, has induced in its primary winding a pulsating or alternating field, the axis of which rotates backwardly at the same speed as the armature of the converter machine.

The single-phase secondary winding 18 of the motor has induced therein a single-phase current by transformer action from the alternating field of the primary winding. The flux produced by the secondary current reacts with the flux produced by the primary current to interlock therewith.

In order to produce torque it is necessary for the magnetic axis of the secondary winding 18 to lag slightly behind the magnetic axis of the primary winding 17. The primary field may, therefore, be resolved into two components, a power component coinciding with the magnetic axis of the secondary winding for transferring power to the secondary winding by transformer action, and a magnetizing component at right angles to said power component for producing a component of magnetic field reacting with the field of the secondary winding to produce torque.

The magnetizing component of the magnetic field in the primary winding 17 may be supplied, if desired, by means of the source of dephased electromotive force 13 supplying current to brushes 15 placed at right angles to the main brushes 11, said current being substantially wattless and in phase with the load current in brushes 11—11. By means of the device just mentioned, the power factor of the currents drawn from the line may be controlled at will.

My motor 16 differs from ordinary polyphase motors in the fact that its secondary winding is single-phase. If its secondary winding were polyphase, the back electromotive forces of the motor would be substantially symmetrical polyphase electromotive forces. The currents drawn from the converting machine would similarly be substantially symmetrical polyphase currents, which could not be completely neutralized in the armature 2 by the single-phase currents therein. Thus, the heating effects in the armature 2 would be immensely increased, and, besides, deleterious harmonic currents would be set up in the armature 2 by reason of the incomplete neutralization of the single-phase currents.

My motor 16 operates similarly to a single-phase series commutator motor, with the exception that the armature is separated from the motor and may be placed in any convenient place, such as the engineer's cab, where it is free from dust and accessible for constant inspection, and where the commutating problem may be freely dealt with in an independent machine.

Particular attention is directed to the peculiar adaptability of the above-described system in railway work, as it permits the propulsion motor 16 to be driven at a wide variety of speeds by a very simple control, the motor producing high torque at all speeds.

Furthermore, the system is equally susceptible of operation in recuperation with like advantages. The machine 1 is relatively simple and light and, therefore, may be placed in the cab where it is readily susceptible of inspection and repairs and where it operates effectively because of freedom of dirt, moisture and other severe operating conditions encountered in a machine mounted on trucks.

While I have shown my invention in its preferred form, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:

1. In an electrical system, the combination with a single-phase translating device, of an armature winding connected to slip rings and a commutator, means connecting said single-phase translating device to said winding through said commutator, and a polyphase translating device carrying unbalanced polyphase currents and connected to said slip rings, said polyphase currents being of such magnitudes and wave-form that they are substantially equal and opposite, at every instant, to the single-phase currents in said armature winding.

2. The combination with a phase-converter of the commutator type, of a single-phase input, means for substantially neutralizing the flow of input current comprising an induction motor connected thereto and provided with a single-phase secondary winding.

3. In an electrical system, the combination with a single-phase translating device, of an armature winding connected to slip rings and a commutator, means connecting said single-phase translating device to said winding through said commutator, and an induction machine having a polyphase primary winding connected to said slip rings and having a single-phase secondary winding.

4. In a distributing system, the combination with a source of single-phase alternating current, of a frequency-changer of the commutator type connected thereto and adapted to produce polyphase currents of adjustable frequency therefrom, means for producing an alternating field in said converter of the frequency of said source and in space quadrature but in time phase with the single-phase currents produced therein by the supply voltage, and an induction motor connected to be energized from the polyphase terminals of said converter, said motor having a polyphase primary winding and a single-phase secondary winding.

5. In a distributing system, the combination with a source of single-phase alternating current, of a frequency-changer of the commutator type provided with a main set of commutator brushes and with an auxaliary set of commutator brushes in quadrature thereto and further provided with polyphase slip rings, connections for supplying energy from said source to said main brushes, means for supplying quadrature-related exciting voltage to said auxiliary brushes, an induction motor connected to said slip rings, said motor comprising a polyphase primary winding and a single-phase secondary winding, and means for adjusting the speed of said frequency-changer.

6. In a distributing system, the combination with a source of single-phase alternating current, of a frequency-changer of the commutator type provided with a main set of commutator brushes and with an auxiliary set of commutator brushes in quadrature thereto and further provided with polyphase slip rings, connections for supplying energy from said source to said main brushes, and means for setting up a field in phase with the single-phase currents in said main brushes.

In testimony whereof, I have hereunto subscribed my name this 2nd day of April, 1919.

JOSEPH SLEPIAN.